United States Patent [19]

Grzesik

[11] 4,099,797

[45] Jul. 11, 1978

[54] ENDLESS TRACK FOR VEHICLE

[75] Inventor: Michel Edouard Grzesik, Crepy-en-Valois, France

[73] Assignee: Societe Anonyme POCLAIN, Belleville, France

[21] Appl. No.: 732,332

[22] Filed: Oct. 14, 1976

[30] Foreign Application Priority Data

Oct. 29, 1975 [FR] France .................................. 75 33098

[51] Int. Cl.² ............................................ B62D 55/28
[52] U.S. Cl. ..................................................... 305/54
[58] Field of Search ...................... 305/54, 58 R, 35 R; 301/44 B, 44 T; 403/408, 405, 379

[56] References Cited

U.S. PATENT DOCUMENTS

| 2,211,896 | 8/1940 | Johnston | 305/54 |
| 3,419,316 | 12/1968 | Mazzarins | 305/54 |

*Primary Examiner*—Robert B. Reeves
*Assistant Examiner*—John P. Shannon
*Attorney, Agent, or Firm*—Lewis H. Eslinger

[57] ABSTRACT

Endless track, particularly for public works machine, comprising a chain having links on which tiles are fixed by means of bolts, while at least one anchoring member, separate from the bolts, extends perpendicularly to the face of contact of a tile and its link and penetrates into a housing provided in each of these two elements, wherein the anchoring member is constituted by a solid element formed by a disc having a tenon on one of its faces.

3 Claims, 4 Drawing Figures

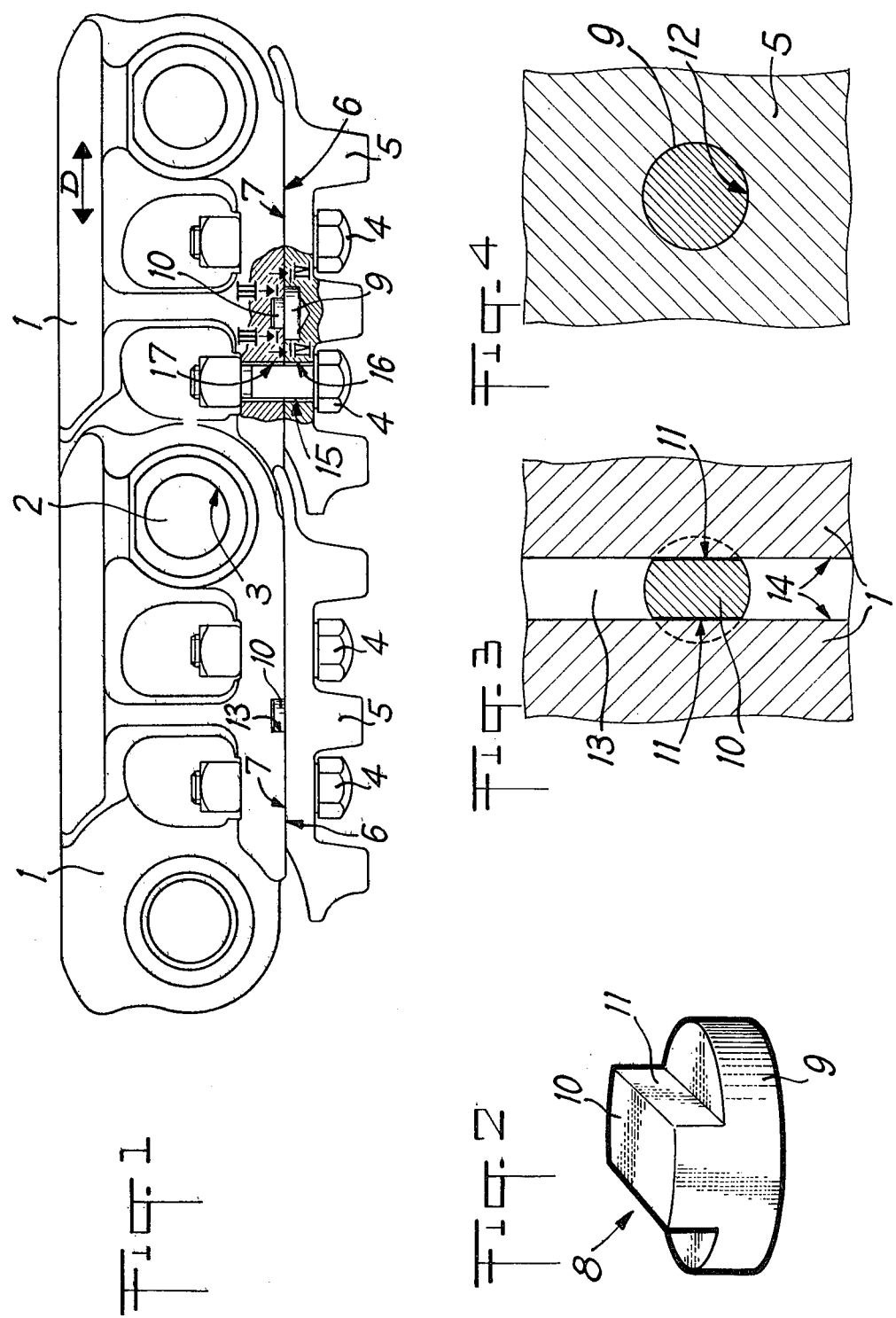

ENDLESS TRACK FOR VEHICLE

The patent invention relates to an endless track for a vehicle.

The endless tracks with which certain vehicles, particularly certain public work machines, are equipped, are constituted by an endless chain having links on which are fixed removable "wearing" elements which abut on the ground, hereinafter referred to as "tiles".

The usual means for fixing these elements are constituted by bolts, but difficulties are encountered when it is desired to make endless tracks subjected to high stresses, by reason of the large dimensions which must be given to the bolts.

It is an object of the present invention to propose a new design of endless track which overcomes the above-mentioned difficulty without having to adopt excessively large bolts.

To this end, the invention relates to an endless track for a public works machine, comprising a chain having links on which tiles are fixed by means of bolts, whilst at least one anchoring member, separate from the bolts, extends perpendicularly to the face of contact of a tile and its link and penetrates into a housing provided in each of these two elements.

The anchoring member is constituted by a solid element formed by a disc having a tenon on one of its faces.

The disc and the tenon of the anchoring member are each fitted in their housings provided in the tile and in the link respectively.

The tenon is preferably substantially parallelepipedic in form, defined in particular by two parallel faces which are perpendicular to the face of contact of the tile and which are in contact with two parallel faces of a groove made in one of the two elements (link or tile) and forming the housing with which said element is provided.

The invention will be more readily understood from reading the following description with reference to the accompanying drawings, in which:

FIG. 1 is a view in elevation, in part section, of an endless track according to the invention;

FIG. 2 is a view in perspective of the anchoring member used for assembling the endless track of FIG. 1;

FIG. 3 is a section along III—III of FIG. 1;

FIG. 4 is a section along IV—IV of FIG. 1.

Referring now to the drawings, FIG. 1 shows two links 1 of an endless track, assembled together by a pin 2 introduced into holes 3, with which each link is provided.

A tile 5 is fixed on each link 1 by bolts 4, one face of contact 7 of said tile being applied on a face 6 of said link.

An anchoring member 8 is provided between each tile and the link to which it is fixed, and is constituted by a cylindrical portion 9 forming disc and by a tenon 10 integral with portion 9, defined by two flat parallel faces 11.

The cylindrical part 9 is inserted, practically without clearance, in a cylindrical cavity 12, which is made in the tile 5, which opens into face 7, and whose axis is perpendicular to said face 7. Furthermore, a groove 13 is made in the link 1, opens into the face 6 and is defined by two parallel faces 14, perpendicular to the face 6. The tenon 10 is inserted in this groove 13 practically without clearance, its faces 11 being in contact with the faces 14 of the groove.

The pulls or forces holding the vehicle back upon braking, which tend to make the link 1 slide with respect to the tile 5 which is fixed thereon in a longitudinal direction D, parallel to the faces 6 and 7, are taken up by the anchoring member which is in shearing stress. The cylindrical part 9 abuts on the faces of the cavity 12, whilst one of the faces 11 itself abuts on the face 14 opposite. On the contrary, the bolts 4 constitute simple fixing members, but do not have to resist the above-mentioned stresses. Their shanks or smooth parts 15 are, moreover, not in contact with the housings 16 and 17, made in the tile 5 and the link 1, respectively, in which they are inserted.

In this way, these bolts 4 may be of average dimensions which are not excessive, even when the endless tracks are high performance ones, such as those with which powerful hydraulic shovels are equipped.

Machining is simple, particularly with regard to a possible embodiment in which the tenon 10 is machined in the very mass of the tile 5.

Furthermore, assembly is very simple, as the tenon 10 may slide in the groove 13, as long as the bolts 4 are not in place.

It will also be noted that there is no assembling stress which risks damaging the tile 5 or link 1.

What is claimed is:

1. An endless track for a public works machine comprising a chain having a plurality of links, separate tiles respectively associated with said links, a plurality of bolts securing said tiles to said links, said tiles and links having recessed housings formed therein opening towards and in axial alignment with each other when the tiles are secured to the links, and at least one anchoring member, separate and independent from the bolts positioned between and extending perpendicularly to the adjacent faces of its associated tile and link and penetrating into said recessed housings in said link and tile, said anchoring member being a solid element formed as a disc having opposite faces being received in the recessed housing of one of said tile and link and a tenon extending from one of its faces out of the disc housing into the housing in the other of said tile and link elements.

2. An endless track as defined in claim 1, wherein the disc and the tenon of the anchoring member are each fitted in their housings provided in the tile and in the link respectively.

3. An endless track as defined in claim 1, wherein the tenon is substantially parallelepipedic in form, defined in particular by two parallel faces, which are perpendicular to the faces of contact of the tile with the link, the housing in said other of the tile and link elements which receive said tenon being formed as a groove having two parallel faces, said parallel faces of the tenon being in contact with the parallel faces of the groove.

* * * * *